United States Patent [19]

Wilkie et al.

[11] Patent Number: 4,698,750
[45] Date of Patent: Oct. 6, 1987

[54] SECURITY FOR INTEGRATED CIRCUIT MICROCOMPUTER WITH EEPROM

[75] Inventors: Brian F. Wilkie; Michael Gallup; John Suchyta; Kuppuswamy Raghunathan, all of Austin, Tex.

[73] Assignee: Motorola, Inc., Schaumburg, Ill.

[21] Appl. No.: 686,785

[22] Filed: Dec. 27, 1984

[51] Int. Cl.⁴ .............................................. G06F 11/00
[52] U.S. Cl. .................................. 364/200; 365/218; 365/185
[58] Field of Search ... 364/200 MS File, 900 MS File; 365/185, 218, 228, 229, 104

[56] References Cited

U.S. PATENT DOCUMENTS

| | | | |
|---|---|---|---|
| 4,005,386 | 1/1977 | Seki et al. | 364/900 |
| 4,139,893 | 2/1979 | Poland | 364/706 |
| 4,430,709 | 2/1984 | Schleapen | 364/200 |
| 4,521,852 | 6/1985 | Guttag | 364/200 |
| 4,521,853 | 6/1985 | Guttag | 364/200 |
| 4,590,552 | 5/1986 | Guttag et al. | 364/200 |
| 4,603,381 | 7/1986 | Guttag | 364/200 |

FOREIGN PATENT DOCUMENTS

WO82/02274 7/1982 PCT Int'l Appl. .

OTHER PUBLICATIONS

"Single-Chip Microcomputer Data", Motorola, Inc., 1984, pp. 3-599 to 3-622.

Primary Examiner—Gareth D. Shaw
Assistant Examiner—Jonathan C. Fairbanks
Attorney, Agent, or Firm—John A. Fisher; Jeffrey Van Myers; James L. Clingan, Jr.

[57] ABSTRACT

An integrated circuit microcomputer with EEPROM has a limited number of modes for operation. In at least first and second modes, the inner workings of the microcomputer, including the contents of the EEPROM, can be read externally from the microcomputer. An EEPROM security bit, when set, prevents the first mode from being entered and causes the EEPROM to be erased when the second mode is entered. The EEPROM is also erased if the security bit is erased.

19 Claims, 5 Drawing Figures

SECURITY FOR INTEGRATED CIRCUIT MICROCOMPUTER WITH EEPROM

FIELD OF THE INVENTION

The subject invention relates to security for software contained in the memory portion of an integrated circuit microcomputer, and more particularly to security for such software for the case in which the memory is EEPROM.

BACKGROUND OF THE INVENTION

Security for programs has long been desirable. In microcomputers with on-board erasable programmable read only memory (EPROM) an effective solution has been developed. A security bit using an EPROM cell prevents the contents of the EPROM from being externally available whenever this security bit is set. To erase the security bits, application of ultraviolet light is made. The application of the ultraviolet light also erases the contents of the EPROM. For testing and other purposes it is necessary to be able to erase the security bit. In the EPROM case, security is maintained because erasing the security bit erases the EPROM so there are no contents of any value to read after the security bit has been erased. The principle can be applied to microcomputers with an on-board electrically erasable programmable read only memory (EEPROM). An EEPROM security bit can prevent the contents of the EEPROM from being externally available. A bulk erase mode would erase the security bit and also the EEPROM. Consequently, any attempt to make the contents of the EEPROM available externally by erasing the security bit would also erase the EEPROM.

This approach assumes that a bulk erase mode is available. A microcomputer will typically have bulk erase capability but not necessarily as a separate mode. For example, a test mode of the microcomputer may have the capability of bulk erase along with other capabilities including the capability of externally reading the contents of the EEPROM. To be analogous to the EPROM case, a separate erase mode would be required. In effect, in the EPROM case, there is a separate erase mode. This erase mode is simply the application of ultraviolet light which does not require any additional circuitry or pins. To provide a separate erase mode requires one or more additional pins and extra circuitry. Additionally, there are many users who do not consider the security bit feature worth the trouble. Consequently, a microcomputer without the security bit would not require the extra pins. This would result in microcomputers with the security bit feature having a different pin-out than microcomputers which are otherwise the same but do not have the security bit. The microcomputer with the security bit would thus be easily distinguishable, a situation that users of the security bit feature would very much like to avoid.

To have a security bit which prevents modes of operation which can access the inner working of the microcomputer would be effective for security, but would present many other problems. One problem is that the state of an EEPROM cell as it comes out of processing is not sufficiently predictable. If the security bit was set after processing, there would not be available a mode for sufficiently testing the microcomputer. Consequently, such microcomputers could not be sold. Another problem is that the user may want to use another program in place of one that has already been entered and secured by setting the security bit. The user would not be able to gain access to the EEPROM and thus lose some of the utility of having EEPROM instead of less expensive ROM. Another problem is testing parts that have been shipped to a user and have been returned because of what is believed to be some defect. Without being able to gain access to the inner workings of the microcomputer, it would not be possible to adequately test for the suspected defect.

SUMMARY OF THE INVENTION

An object of the present invention is to provide an improved EEPROM integrated circuit microcomputer.

Another object of the invention is to provide an improved technique for preventing unauthorized appropriation of software contained in an EEPROM of a micromputer.

Yet another object of the invention is to provide an improved EEPROM microcomputer with security.

These and other objects of the invention are achieved in a microcomputer which has an on-board EEPROM and is characterized as having a first mode of operation in which the contents of the EEPROM can be read externally from the microcomputer and a second mode of operation in which the contents of the EEPROM cannot be read externally from the microcomputer. The microcomputer has an EEPROM security bit which can be set after the EEPROM has been loaded. The security bit is erasable only if the EEPROM is also erased. The EEPROM is erased if the first mode of operation is entered when the security bit has been set.

Figure 1:
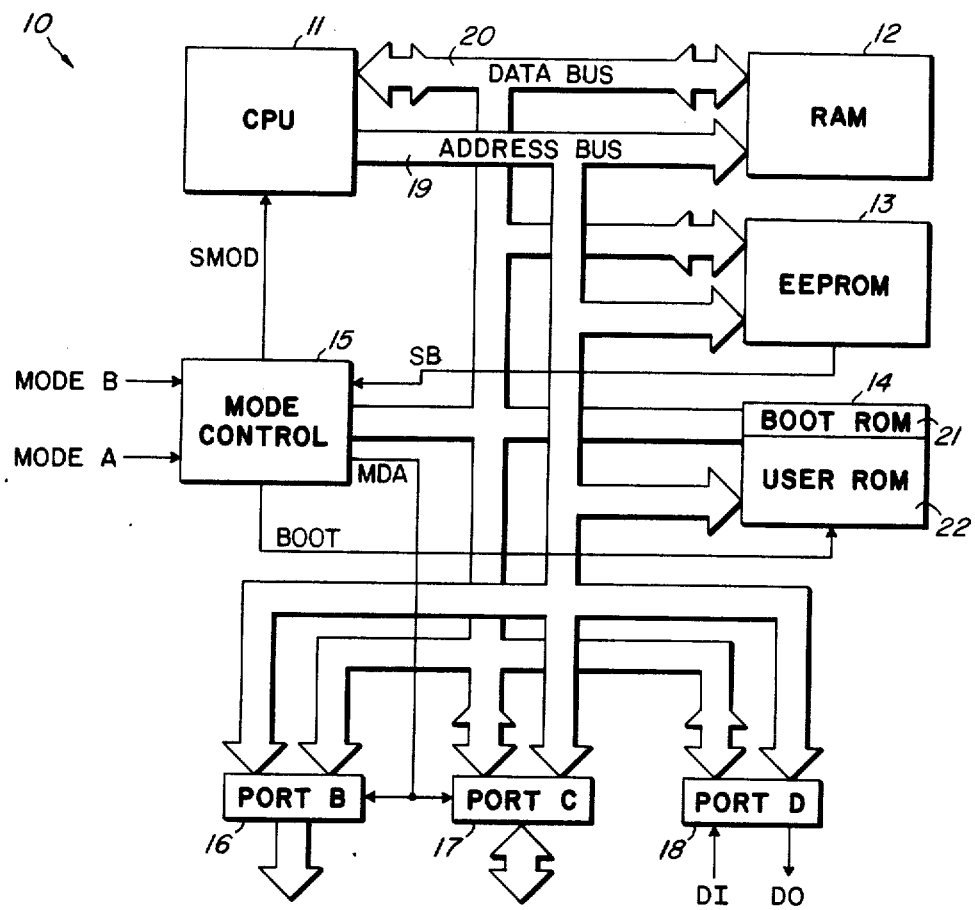
FIG. 1 is a block diagram of a microcomputer according to a preferred embodiment of the invention.

DESCRIPTION OF THE INVENTION Shown in FIG. 1 is a microcomputer 10 comprised generally of a central processing unit (CPU) 11, a random access memory (RAM) 12, an electrically erasable programmable read only memory (EEPROM) 13, a read only memory (ROM) 14, a mode control circuit 15, a port B 16, a port C 17, a port D 18, an address bus 19, and a data bus 20. Data bus 20 is byte-wide, i.e., 8 bits wide. Address bus 19 is 16 bits wide. A location in memory is addressed with 16 bits on address bus 19.

CPU 11 has an 8 bit input/output (I/O) connected to data bus 20, a 16 bit output connected to address bus 19, a control input for receiving a signal SMOD from mode control circuit 15. RAM 12 has an 8 bit I/O connected to data bus 20, and a 16 bit input connected to address bus 19. EEPROM 13 has an 8 bit I/O connected to data bus 20, an output for providing a security bit signal SB and a 16 bit input connected to address bus 19. ROM 14 has an 8 bit output connected to data bus 20, and a 16 bit input connected to address bus 19. Mode control circuit 15 has a first input for receiving a mode A signal which is provided externally from microcomputer 10, a second input for receiving a mode B signal which is provided externally from microcomputer 10, a third input for receiving signal SB, a first output for providing a mode signal MDA, a second output for providing a single-chip mode signal SMOD, and an 8 bit output connected to data bus 20. Port 16 has an 8 bit input connected to data bus 20, a 16 bit input connected to address bus 19, and an 8 bit output for providing an output for microcomputer 10. Port 17 has an 8 bit I/O connected to data 20, a 16 bit input connected to address 19, and an 8 bit I/O for providing an I/O for microcomputer 10. Port 18 has an 8 bit I/O connected to data bus 20, a 16 bit input connected to address bus 19, an input for receiving an external data input signal DI, and an output for externally providing an output data signal DO.

Microcomputer 10 has four modes of operation; single-chip mode, expanded mode, bootstrap mode, and test mode. In the single-chip mode, MCU 10 functions as a self-contained microcomputer and provides no external access to or from data bus 20 or address bus 19. In this mode, microcomputer 10 provides maximum use of its pins for providing outputs for controlling external circuitry.

In the expanded mode, port 16 can couple 8 high order address bits to external memory from address bus 19. Port 17 can couple 8 low order address bits from address bus 19 to external memory or receive or ourput data from or to data bus 20. Consequently, an external program can be implemented which will cause the contents of EEPROM 13 to be externally available via port 17.

In the bootstrap mode, RAM 12 is loaded via port 18 which is a serial port. ROM 14 has two portions; a boot ROM 21 and a user ROM 22. In the bootstrap mode, RAM 12 is loaded under the direction of a program loaded into boot ROM 21. As is well known, a program loaded into a ROM is done so as part of the manufacturing process. This type of loading of a RAM is called boot loading. There are essentially no limitations on the program boot loaded into RAM 12. Such a program may be used for such functions as test and diagnostics of a system of which microcomputer 10 is a part and for programming EEPROM 13. After the last character is loaded into RAM 12, control of microcomputer 10 is passed to the program resident in RAM 12. The contents of EEPROM 13 could be provided externally via port 16, 17 or 18 under the direction of such a program boot loaded into RAM 12.

The test mode is similar to the expanded mode in that external memory may be addressed. In this mode a reset vector is fetched from external memory space. The information at the reset vector location is an address which is loaded into a program counter of microcomputer 10 and which is incremented when clocked. The program counter sequentially addresses memory space to run programs. Thus, for testing purposes, program control may be vectored to an external test program. Also program control may be vectored to an external program which will cause EEPROM 13 to provide its contents externally via port 16 or 17.

The single-chip mode is entered under normal operation by the mode A signal being a logic low and the mode B signal being at a positive power supply voltage, VDD. The expanded mode is entered under normal operation by the mode A signal being a logic high and the mode B signal being at VDD. The bootstrap mode is entered under normal operation by the mode A signal being at logic low and the mode B signal being at a voltage of 1.4 times VDD or greater. The test mode is entered under normal operation by the mode A signal being at a logic high and the mode B signal being at a voltage of 1.4 times VDD or greater.

These four modes are known in the art. A Motorola, Inc. data book entitled "Single-Chip Microcomputer Data", 1984, at pages 3-599 to 3-622, describe in detail an MC68HC11A4 microcomputer with these four modes. In three of the operating modes, the contents of the EEPROM can be read externally. Only in the single-chip mode is it not possible to maneuver microcomputer 10 in such a way as to externally read the contents of EEPROM 13.

Figure 2:
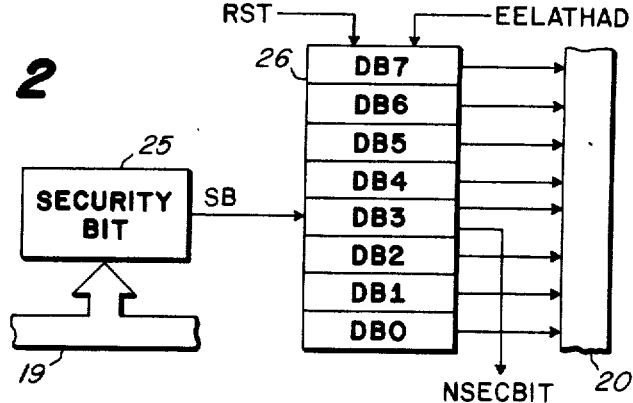
FIG. 2 is a block diagram of a portion of the microcomputer of FIG. 1 used for implementing the preferred embodiment of the invention.
Figure 3:
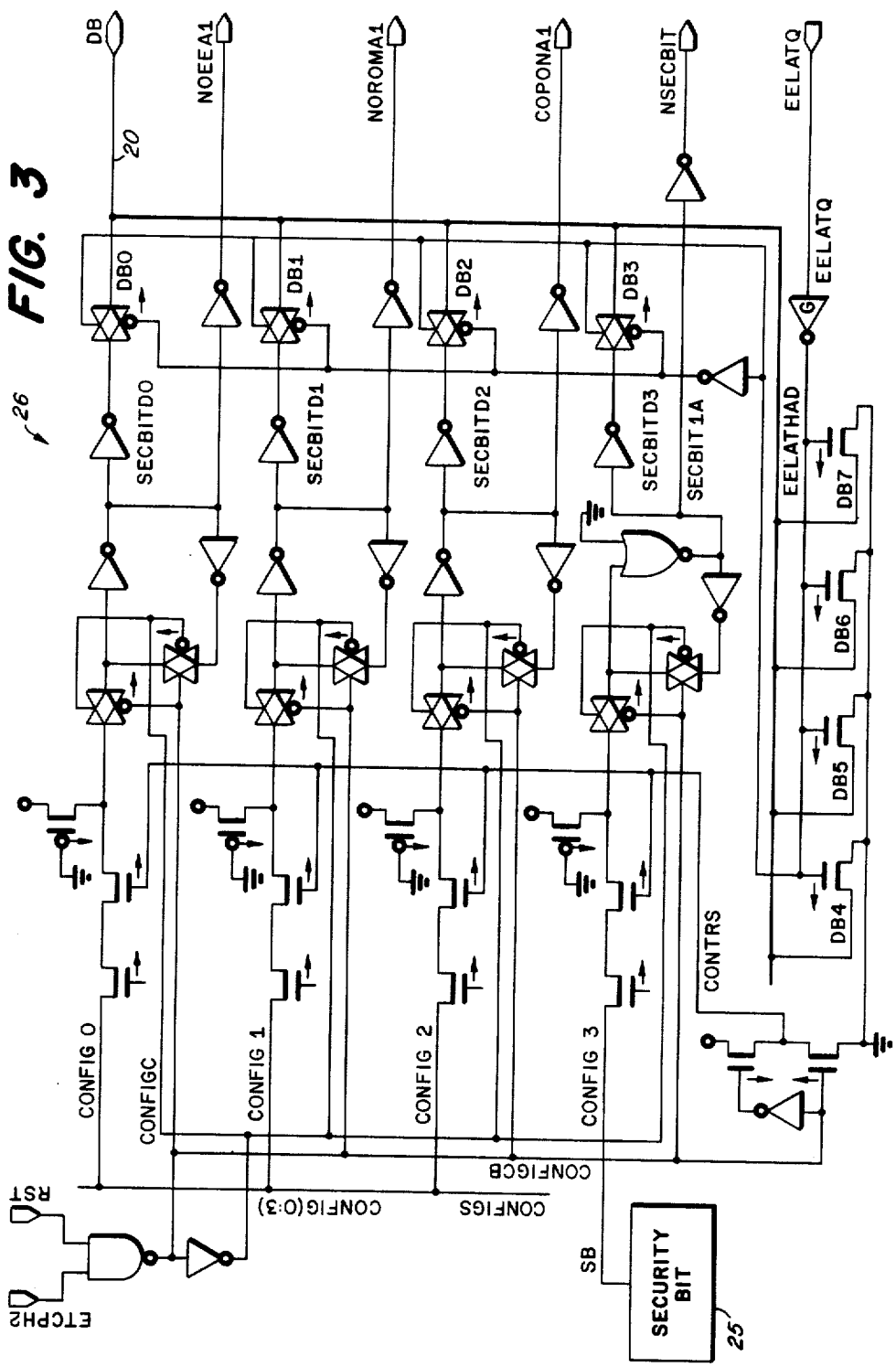
FIG. 3 is a circuit diagram of a major portion of the block diagram of FIG. 2.

Shown in FIG. 2 is a portion of microcomputer 10 which is useful, according to a preferred embodiment of the invention, for preventing the contents of EEPROM 13 being read externally. Shown in FIG. 2 is a security bit 25, address bus 19, a security register 26, and data bus 20. Security bit 25 is an EEPROM cell which is addressed for reading and writing by address bus 19 but is not part of the memory address space allocated to EEPROM 13. For example, EEPROM 13 address space is from $B600 to $B7FF, whereas security bit 25 is addressed by $103F. When security bit 25 is erased, a bulk erase of EEPROM 13 also occurs, but EEPROM 13 can be erased separately from security bit 25. Security bit 25 provides separate signal SB to register 26 which is part of mode control circuit 15. A register location DB3 of register 26 is loaded with the contents of security bit 25 as indicated by signal SB in response to a reset signal RST. Signal RST must be activated, as is conventional, for microcomputer 10 to be operational. Furthermore, signal RST is generated at power-up. This is generally known as power-on reset. Register 26 provides a register security bit signal NSECBIT indicative of the contents of register location DB3. Register 26 is an 8 bit register having its output connected to data bus 20. The contents of register 26 are written onto data bus 20 in response to an EEPROM latch address signal EELATHAD. Consequently, the status of security bit 25 can be read by reading the DB3 location on data bus 20 after generating the predetermined address for causing signal EELATHAD. Enabling a register in this manner is conventional. A detailed circuit diagram of register 26 is shown in FIG. 3.

Mode control circuit 15 internally generates signal SMOD and signal MDA for actual mode selection. If signal SMOD is a logic low and signal MDA is a logic low, the single-chip mode is selected. If signal SMOD is a logic low and signal MDA is a logic high, the expanded mode is selected. If signal SMOD is a logic high and signal MDA is a logic low, the bootstrap mode is selected. If signal SMOD is a logic high and signal MDA is a logic high, the test mode is selected. To enter the expanded mode or the test mode signal MDA must be a logic high. Normally, signal MDA is responsive to external signal mode A. As part of the measures for securing the contents of EEPROM 13, however, the MDA is forced to a logic low when security bit 25 is active.

Figure 4:
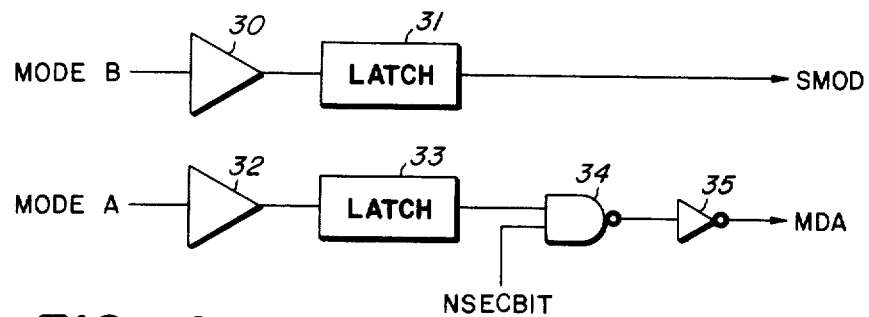
FIG. 4 is a block diagram of a portion of the microcomputer of FIG. 1

Shown in FIG. 4 is a block diagram of a circuit for providing signals SMOD and MDA comprised of an amplifier/detector 30, a latch 31, an amplifier/detector 32, a latch 33, a NAND gate 34, and an inverter 35. Amplifier/detector 30 and latch 31, and amplifier/detector 32 and latch 33 detect and hold mode B signal and mode A signal, respectively. Signal SMOD is thus provided by latch 31 and is indicative of a received mode B signal. NAND gate 34 and inverter 35 are interposed between latch 33 and signal MDA. NAND gate 34 has a first input coupled to an output of latch 33, and a second input for receiving signal NSECBIT. Signal NSECBIT is a logic low when security bit 25 of FIG. 2 is set. Consequently, when security bit 25 is set, NAND gate 34 will have a logic high output coupled to an input of inverter 35, causing inverter 35 to output signal MDA as a logic low. With signal MDA at a logic low, neither the expanded mode nor the test mode can be entered. Setting the security bit thus secures the contents of EEPROM 13 from being read by virtue of microcomputer 10 having an expanded mode or a test mode.

The remaining concern for security of EEPROM 13 is the bootstrap mode. Of course microcomputer 10 could be prevented from entering the bootstrap mode by using signal NSECBIT to force signal SMOD to a logic low. This would have the effect of forcing microcomputer 10 into the single-chip mode when security bit 25 is set. Such a solution would be effective for securing the contents of EEPROM 13 but would not leave a way to erase EEPROM 13. By the nature of the single-chip mode in which external program control is not allowed, erasing EEPROM 13 cannot be externally exercised in the single-chip mode. In such a case, when the security bit is set, there would not be a way to alter the contents of EEPROM 13 or test microcomputer 10. In the event it was discovered that micorocmputer 10 was not performing as desired, it would be difficult, if not impossible, to determine whether the program was faulty or microcomputer 10 had a defect. Additionally, it may be desirable to upgrade or replace the program contained in EEPROM 13, an option which would not be available.

The solution, according to a preferred embodiment of the invention, is to cause EEPROM 13 along with security bit 25, to be erased upon entering the bootstrap mode. Upon proper commands to microcomputer 10 to enter the bootstrap mode, boot ROM 21 takes control. The first operation is to check the condition of security bit 25. This is done by checking location DB3 of register 26 via data bus 20. If security bit 25 is set, EEPROM 13 is erased. This is done by executing a bulk erase instruction. Because an external high voltage is typically required to erase an EEPROM, EEPROM 13 will not in fact be erased in the absence of such high voltage signal even though an erase instructon is executed. Consequently, the program in boot ROM 21 checks to make sure that EEPROM 21 has in fact been erased before proceeding with the regular function of boot ROM 21 controlling the loading of RAM 12 from port 18. If EEPROM 13 is not erased during the bulk erase instruction, then the bulk erase instruction will be executed again. The program in boot ROM 21 will loop in this fashion until EEPROM 13 is in fact erased. After EEPROM 13 has been erased, the program in boot ROM executes a RAM erase instruction so that RAM 12 is erased as well as EEPROM 13. The RAM 12 erasure is achieved by writing a logic high into all RAM 12 locations. Erasure of EEPROM 12 also results in all EEPROM 13 locations being a logic high.

Figure 5:
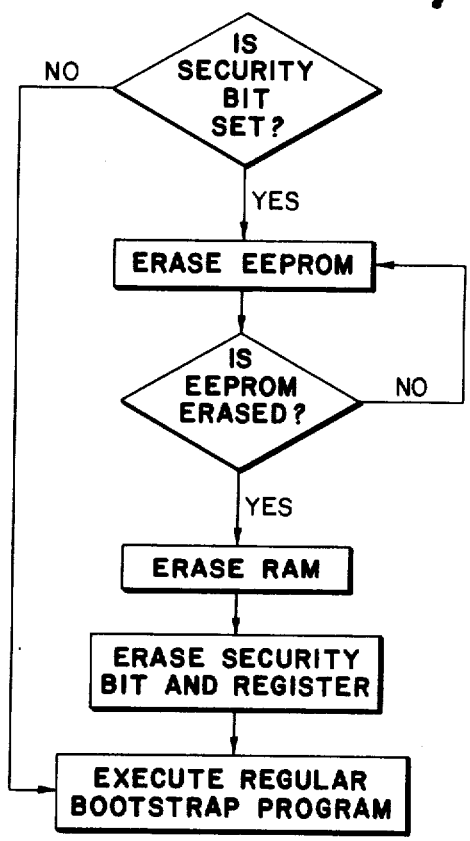
FIG. 5 is a flow diagram of a program present in the microcomputer of FIG. 1 according to a preferred embodiment of the invention.

Security bit 25 and register 26 are erased after RAM 12 has been erased. The bulk erase instruction does not include erasure of security bit 25. A signal is sent externally via port 18 after security bit 25 has been erased. Such signal is particularly useful for aiding the testing of microcomputer 10. Erasing security bit 25 after EEPROM 13 and RAM 12 have been cleared provides further security. An EEPROM cell is erased more and more with time. If security bit 25 were erased simultaneously with EEPROM 13, a partial erase could be done during a bulk erase which could result in the security bit being detected as not set but yet many of the EEPROM cells being readable. Consequently a large portion of an EEPROM could be read in this manner. To avoid this, no attempt is made to erase security bit 25 until after verification that EEPROM 13 has been erased. After security bit 25 and register 26 are cleared, the regular bootstrap program for loading RAM 12 via port 18 is executed. A flow diagram for the portion of the bootstrap program which relates to clearing EEPROM 13, RAM 12, security bit 25, and register 26 is shown in FIG. 5. A listing for the entire bootstrap program is provided in the appendix.

A combined hardware and software implementation effectively secures EEPROM 12 as well as RAM 13. Signal NSECBIT, when security bit 25 is set, is used to prevent the expanded and test modes from being entered. With security bit 25 set, only the bootstrap and single-chip modes can be entered. Entering the single-chip mode is not useful for obtaining the contents of internal memory, EEPROM 13 and RAM 12. Upon entering the bootstrap mode, internal memory, EEPROM 13 and RAM 12, are erased under the control of software, the program in boot ROM 21. With security bit 25 set, two of the three modes in which internal memory contents can be externally read are locked out with hardware. The third mode in which internal memory can be read externally, when entered, erases internal memory before any internal memory contents can be read.

APPENDIX

```
*BOOT
*
*BOOTLOADER FIRMWARE FOR 68HC11
*
*EQUATES FOR USE WITH INDEX OFFSET = $1000

0000 00 08        PORTD     EQU     $08
0000 00 09        DDRD      EQU     $09
0000 00 2b        BAUD      EQU     $2B
0000 00 2c        SCCR1     EQU     $2C
```

```
0000 00 2d         SCCR2     EQU     $2D
0000 00 2e         SCSR      EQU     $2E
0000 00 2f         SCDAT     EQU     $2F
0000 00 3b         PPROG     EQU     $3B
0000 00 3e         TEST1     EQU     $3E
0000 00 3f         CONFIG    EQU     $3F
                   *
                   * MORE EQUATES
                   *
0000 b6 00         EEPSTR    EQU     $B600       START OF EEPROM
0000 b7 ff         EEPEND    EQU     $B7FF       END OF EEPROM
                   *
                   ********
                   *THIS BOOSTRAP PROGRAM ALLOWS THE USER TO
                   *DOWNLOAD A PROGRAM OF EXACTLY 256 BYTES.
                   *THE PROGRAM MUST START AT $0000.
                   *EACH BYTE OF THE PROGRAM IS RECEIVED BY THE
                   *SCI, STARTING WITH THE $0000 BYTE AND WORKING
                   *UP TO THE $00FF BYTE.
                   *
                   *THE TRANSMITTER WILL BE USED FOR THE PURPOSE
                   *OF COMMUNICATION TO THE OUTSIDE WORLD.
                   *
                   *******************************************
0000                         ORG     $BF40
                   *
bf40 bf 40         BEGIN     EQU     *
                   * INIT STACK
bf40 8e 00 ff                LDS     #$00FF
                   * INIT X REG FOR INDEXED ACCESS TO REGISTERS
bf43 ce 10 00                LDX     #$1000
                   ********
                   * INIT SCI AND RESTART BAUD DIVIDER CHAIN
bf46 86 a2                   LDAA    #$A2         DIV BY 16
bf48 a7 2b                   STAA    BAUD,X
                   * RECEIVER & TRANSMITTER ENABLED
bf4a 86 0c                   LDAA    #$0C
bf4c a7 2d                   STAA    SCCR2,X
                   ********
                   * TEST THE SECURITY BIT
bf4e 1e 3f 08 35             BRSET   CONFIG,X $08 NOSEC
                   *****************************************************
                   * WE ARE IN SECURITY MODE
                   *
bf52 86 ff                   LDAA    #$FF
                   * OUTPUT $FF ON TRANSMITTER
bf54 bf 54         AGAIN     EQU     *
bf54 a7 2f                   STAA    SCDAT,X
                   * ERASE EEPROM
                   * SET ERASE AND EELAT BITS BEFORE USING "ERASE"
bf56 c6 06                   LDAB    #$06
bf58 e7 3b                   STAB    PPROG,X
bf5a f7 b6 00                STAB    EEPSTR       WRITE EEPROM LOCATION
bf5d 8d 64                   BSR     ERASE
                   * ACCB IS NOW SET FOR $06
                   ********
                   * ERASE CYCLE IS COMPLETE
                   *
                   * IF THE NOEE BIT IS SET, WE CAN`T CHECK THAT
                   * THE EEPROM IS ERASED
bf5f 1e 3f 01 11             BRSET   CONFIG,X $01 NOEE
                   * NOEE IS CLEAR, NOW CHECK THAT THE EEPROM IS
                   * ERASED
```

```
bf63 18 ce b6 00                  LDY    #EEPSTR
bf67 bf 67          LOOP   EQU    *
bf67 18 a1 00                     CMPA   0,Y       (A = $FF)
                  * ANY UNERASED BYTE SENDS US BACK TO ERASE AGAIN
bf6a 26 e8                        BNE    AGAIN
bf6c 18 08                        INY
bf6e 18 8c 00 ee                  CPY    #$EEPEND+1
bf72 26 f3                        BNE    LOOP
bf74 bf 74          NOEE   EQU    *
                  ****************************************************
                  * WRITE $FF TO ENTIRE RAM (EXCEPT LAST TWO BYTES
                  * WHICH ARE USED BY THE STACK)
                  *
bf74 bf 74          ERAM   EQU    *
bf74 3c                           PSHX
bf75 ce ff 02                     LDX    #$FF02
bf78 bf 78          LOP1   EQU    *
bf78 a7 fe                        STAA   $FE,X
bf7a 08                           INX
bf7b 26 fb                        BNE    LOP1
bf7d 38                           PULX
                  ****************************************************
                  * NOW ERASE CONFIG REGISTER
                  *
bf7e 44                           LSRA             ($FF -> $7F)
bf7f bf 7f          ECONFG EQU    *
                  * OUTPUT $7F ON TRANSMITTER
bf7f a7 2f                        STAA   SCDAT,X
                  * SET ERASE AND EELAT BITS
bf81 e7 3b                        STAB   PPROG,X   (B STILL = $06)
                  * WRITE CONFIG REGISTER LATCH IT FOR ERASURE
bf83 e7 3f                        STAB   CONFIG,X
bf85 8d 3c                        BSR    ERASE
                  ********
                  * ERASE CYCLE IS COMPLETE
                  *
                  ****************************************************
                  *NON-SECURITY AND SECURITY MODES MEET HERE
                  *
bf87 bf 87          NOSEC  EQU    *
                  * SEND BREAK TO SIGNAL START OF DOWNLOAD
bf87 1c 2d 01                     BSET   SCCR2,X $01
                  * CLEAR BREAK AS SOON AS START BIT IS DETECTED
bf8a 1e 08 01 fc                  BRSET  PORTD,X $01 *
bf8e 1d 2d 01                     BCLR   SCCR2,X $01   CLEAR BREAK
                  * WAIT FOR FIRST CHARACTER (USERS SEND $FF)
bf91 1f 2e 20 fc                  BRCLR  SCSR,X $20 * WAIT FOR RDRF
bf95 a6 2f                        LDAA   SCDAT,X       READ DATA
                  * IF DATA = $55, THEN SKIP DOWNLOAD (TEST MODE)
bf97 81 55                        CMPA   #$55
bf99 27 25                        BEQ    STAR
                  * IF DATA = $FF, THEN /16 IS CORRECT BAUD
bf9b 81 ff                        CMPA   #$FF
bf9d 27 0a                        BEQ    BAUDOK
                  * IF FE IS SET (BREAK) JUMP TO EEPROM
bf9f 1f 2e 02 03                  BRCLR  SCSR,X $02 NOTBRK
bfa3 7e b6 00                     JMP    $B600
bfa6 bf a6          NOTBRK EQU    *
                  * ELSE CHANGE TO /104 (/13 & /8) 1200 @ 2MHZ
bfa6 1c 2b 33                     BSET   BAUD,X $33
                  * THEN DOWNLOAD 256 BYTE PROGRAM
bfa9 bf a9          BAUDOK EQU    *
bfa9 18 ce 00 00                  LDY    #$0000        INIT POINTER
```

```
                         * READ IN PROGRAM AND PUT INTO RAM
bfad bf ad               BK2     EQU     *
bfad 1f 2a 20 fc                 BRCLR   SCSR,X $20 *  WAIT FOR RDRF
bfb1 a6 2f                       LDAA    SCDAT,X
bfb3 18 a7 00                    STAA    $00,Y
bfb6 a7 2f                       STAA    SCDAT,X         HANDSHAKE
bfb8 18 08                       INY
                         * UNTIL THE END IS REACHED
bfba 18 8c 01 00                 CPY     #$0100
bfbe 26 ed                       BNE     BK2
                         ***************************************************
                         * ALL START USER'S PROGRAM
                         *
bfc0 bf c0               STAR    EQU     *
bfc0 7e 00 00                    JMP     $0000
                         ***************************************************
                         * EEPROM ERASE SUBROUTINE
                         *
                         * ASSUMES CALLING ROUTINE HAS ALREADY SET ERASE
                         * AND EELAT BITS, AS WELL AS ACCESSED CONFIG REG
                         * IF THAT IS TO BE ERASED
                         *
                         * ENTRY X=$1000
                         * EXIT  X=$1000, Y=$0000
                         *
bfc3 bf c3               ERASE   EQU     *
                         * SET EEPGM BIT
bfc3 1c 3b 01                    BSET    PPROG,X $01
                         * 10 MILLISEC DELAY @ 2.1 MHZ
bfc6 18 ce 0b b8                 LDY     #3000
bfca 18 09               BK1     DEY
bfcc 26 fc                       BNE     BK1
                         * TURN OFF EEPGM BIT
bfce 1d 3b 01                    BCLR    PPROG,X $01
                         * TURN OFF ERASE AND EELAT BITS
bfd1 6f 3b                       CLR     PPROG,X
bfd3 39                          RTS
                         ***************************************************
                         * VECTORS
                         *
bfd4                             ORG     $BFD6
bfd6 00 c4                       FDB     $100-60         SCI
bfd8 00 c7                       FDB     $100-57         SPI
bfda 00 ca                       FDB     $100-54         PULSE ACCUM INPUT EDGE
bfdc 00 cd                       FDB     $100-51         PULSE ACCUM OVERFLOW
bfde 00 d0                       FDB     $100-48         TIMER OVERFLOW
bfe0 00 d3                       FBD     $100-45         TIMER OUTPUT COMPARE 5
bfe2 00 d6                       FDB     $100-42         TIMER OUTPUT COMPARE 4
bfe4 00 d9                       FDB     $100-39         TIMER OUTPUT COMPARE 3
bfe6 00 dc                       FDB     $100-36         TIMER OUTPUT COMPARE 2
bfe8 00 df                       FDB     $100-33         TIMER OUTPUT COMPARE 1
bfea 00 e2                       FDB     $100-30         TIMER INPUT CAPTURE 3
bfec 00 e5                       FDB     $100-27         TIMER INPUT CAPTURE 2
bfee 00 e8                       FDB     $100-24         TIMER INPUT CAPTURE 1
bff0 00 eb                       FDB     $100-21         REAL TIME INT
bff2 00 ee                       FDB     $100-18         IRQ
bff4 00 f1                       FDB     $100-15         XIRQ
bff6 00 f4                       FDB     $100-12         SWI
bff8 00 f7                       FDB     $100-9          ILLEGAL OP-CODE
bffa 00 fa                       FDB     $100-6          COP FAIL
bffc 00 fd                       FDB     $100-3          CLOCK MONITOR
bffe bf 40                       FDB     #BEGIN          RESET
c000                             END
```

What is claimed is:

1. In an integrated circuit microcomputer having on-board memory including an EEPROM and having detection means for detecting a request for a mode of operation of the microcomputer and characterized as having a first mode of operation in which contents of the EEPROM can be read externally from the microcomputer, and a second mode of operation in which the contents of the EEPROM cannot be externally read from the microcomputer, means for securing the contents of the on-board memory, comprising:
   an EEPROM security bit which can be set after the EEPROM has been loaded and which is erasable only if the EEPROM is also erased; and
   first means, coupled to the detection means, for erasing the contents of the EEPROM in response to the detection means receiving a request for the first mode of operation when the security bit is set.

2. The microcomputer of claim 1, wherein the first means erases the security bit after the EEPROM has been erased.

3. The microcomputer of claim 2 further having an on-board RAM, wherein the first means erases the RAM in response to entering the first mode of operation when the security bit is set.

4. The microcomputer of claim 3 further having a third mode of operation in which the contents of the EEPROM can be read externally from the microcomputer, wherein the means for securing the contents of the on-board memory further comprises:
   second means for preventing the microcomputer from entering the third mode of operation when the security bit is set.

5. The microcomputer of claim 1 further having a third mode of operation in which the contents of the EEPROM can be read externally from the microcomputer, wherein the means for securing the contents of the on-board memory further comprises:
   second means for preventing the microcomputer from entering the third mode of operation when the security bit is set.

6. The microcomputer of claim 5, wherein the first means erases the security bit after the EEPROM has been erased.

7. In an integrated circuit microcomputer having on-board memory including an EEPROM and having detection means for detecting a request for a mode of operation of the microcomputer and characterized as having a first mode of operation in which contents of the EEPROM can be read externally from the microcomputer, and a second mode of operation in which the contents of the EEPROM cannot be read externally from the microcomputer, a method of securing the contents of the on-board memory, comprising:
   providing an EEPROM security bit which can be set after the EEPROM has been loaded;
   loading the EEPROM;
   setting the security bit; and
   erasing the EEPROM in response to the detection means receiving a request for the first mode of operation.

8. The method of claim 7 further comprising:
   erasing the security bit after the EEPROM has been erased.

9. The method of claim 8 further comprising:
   checking the EEPROM to verify that it has been erased before erasing the security bit; and
   preventing the erasure of the security bit if any of the EEPROM which was checked was not erased.

10. The method of claim 9 futher comprising:
    providing the microcomputer with a third mode of operation in which the contents of the EEPROM can be externally read; and
    preventing the microcomputer from entering the third mode of operation when the security bit is set.

11. The method of claim 10 further comprising:
    providing an on-board RAM; and
    erasing the RAM in response to entering the first mode of operation when the security bit is set.

12. In an integrated circuit microcomputer having on-board memory including an EEPROM and a ROM and having detection means for detecting a request for a mode of operation of the microcomputer and characterized as having a first mode of operation in which contents of the EEPROM can be read externally from the microcomputer, and a second mode of operation in which the contents of the EEPROM cannot be read externally from the microcomputer, a method of securing the contents of the on-board memory, comprising:
    providing an EEPROM security bit which can be set after the EEPROM has been loaded;
    loading the ROM with a program which causes the microcomputer to erase the EEPROM in response to the detection means receiving a request for the first mode of operation.

13. The method of claim 12 wherein the program loaded into the ROM is further characterized as causing the microcomputer to erase the security bit after the EEPROM has been erased.

14. In an integrated circuit microcomputer having on-board memory including an EEPROM and having detection means for detecting a request for a mode of operation of the microcomputer and characterized as having a first mode of operation in which contents of the EEPROM can be read externally from the microcomputer and a second mode of operation in which the contents of the EEPROM cannot be read externally from the microcomputer, means for securing the contents of the on-board memory comprising:
    an EEPROM security bit which can be set after the EEPROM has been loaded;
    a ROM containing a program which causes the microcomputer to erase the EEPROM in response to the detection means receiving a request for the first mode of operation when the security bit is set.

15. The microcomputer of claim 14 wherein the ROM is further characterized by the program therein causing the microcomputer to erase the security bit after the EEPROM has been erased.

16. The microcomputer of claim 15 further having an on-board RAM, wherein the ROM is further characterized by the program therein causing the microcomputer to erase the RAM in response to entering the first mode when the security bit is set.

17. The microcomputer of claim 16 further having a third mode of operation in which the contents of the EEPROM can be read externally, wherein the means for securing the contents of the on-board memory further comprises:
    means for preventing the microcomputer from entering the third mode of operation when the security bit is set.

18. The microcomputer of claim 14 further having a third mode of operation in which the contents of the EEPROM can be read externally, wherein the means for securing the contents of the on-board memory further comprises:
    means for preventing the microcomputer from entering the third mode of operation when the security bit is set.

19. The microcomputer of claim 18 wherein the ROM is further characterized by the program therein causing the microcomputer to erase the security bit after the EEPROM has been erased.

* * * * *